(12) United States Patent
Kim et al.

(10) Patent No.: US 10,469,862 B2
(45) Date of Patent: Nov. 5, 2019

(54) METHOD FOR DECODING IMAGE AND APPARATUS USING SAME

(71) Applicant: LG ELECTRONICS INC., Seoul (KR)

(72) Inventors: Jungsun Kim, Seoul (KR); Joonyoung Park, Seoul (KR); Chulkeun Kim, Seoul (KR); Hendry Hendry, Seoul (KR); Byeongmoon Jeon, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/055,622

(22) Filed: Aug. 6, 2018

(65) Prior Publication Data

US 2018/0352242 A1    Dec. 6, 2018

Related U.S. Application Data

(63) Continuation of application No. 15/707,794, filed on Sep. 18, 2017, now Pat. No. 10,045,039, which is a
(Continued)

(51) Int. Cl.
*H04N 19/44* (2014.01)
*H04N 19/91* (2014.01)
(Continued)

(52) U.S. Cl.
CPC ........... *H04N 19/44* (2014.11); *H04N 19/124* (2014.11); *H04N 19/176* (2014.11);
(Continued)

(58) Field of Classification Search
CPC .. H04N 19/463; H04N 19/124; H04N 19/176; H04N 19/184; H04N 19/44;
(Continued)

(56) References Cited

U.S. PATENT DOCUMENTS 7,092,576 B2    8/2006  Srinivasan
7,162,093 B2    1/2007  Regunathan
(Continued)

FOREIGN PATENT DOCUMENTS

KR    10-2009-0108108    10/2009
KR    10-2011-0061273    6/2011
(Continued)

OTHER PUBLICATIONS

International Search Report dated Oct. 21, 2013 for Application No. PCT/KR2013/005858, with English Translation, 14 pages.

*Primary Examiner* — Obafemi O Sosanya
(74) *Attorney, Agent, or Firm* — Fish & Richardson P.C.

(57) ABSTRACT

A method or coding image information, according to the present invention, comprises the steps of: binarizing according to different techniques, index values of forward prediction, backward prediction, and bidirectional prediction, depending on whether the bidirectional prediction is applied when inter-predicting a current block; and entropy coding a binarized codeword, wherein whether to apply the bidirectional prediction when inter-predicting the current block can be determined on the basis of the size of the current block. As a result, provided are a method for binarizing an inter-prediction direction of a prediction unit having a specific size, and an apparatus using same.

15 Claims, 7 Drawing Sheets

Related U.S. Application Data continuation of application No. 15/464,611, filed on Mar. 21, 2017, now Pat. No. 9,769,487, which is a continuation of application No. 14/359,634, filed as application No. PCT/KR2013/005858 on Jul. 2, 2013, now Pat. No. 9,621,909.

(60) Provisional application No. 61/666,938, filed on Jul. 2, 2012, provisional application No. 61/666,936, filed on Jul. 2, 2012.

(51) Int. Cl.
    *H04N 19/463*      (2014.01)
    *H04N 19/124*      (2014.01)
    *H04N 19/176*      (2014.01)
    *H04N 19/184*      (2014.01)
    *H04N 19/503*      (2014.01)

(52) U.S. Cl.
    CPC ......... *H04N 19/184* (2014.11); *H04N 19/463* (2014.11); *H04N 19/503* (2014.11); *H04N 19/91* (2014.11)

(58) Field of Classification Search
    CPC .... H04N 19/503; H04N 19/91; H04N 19/103; H04N 19/70
    See application file for complete search history.

(56) References Cited

U.S. PATENT DOCUMENTS

| | | |
|---|---|---|
| 7,317,839 B2 | 1/2008 | Holcomb |
| 7,369,709 B2 | 5/2008 | Hsu |
| 7,529,302 B2 | 5/2009 | Mukerjee |
| 7,567,617 B2 | 7/2009 | Holcomb |
| 7,577,198 B2 | 8/2009 | Holcomb |
| 7,577,200 B2 | 8/2009 | Holcomb |
| 7,590,179 B2 | 9/2009 | Mukerjee |
| 7,599,438 B2 | 10/2009 | Holcomb |
| 7,606,308 B2 | 10/2009 | Holcomb |
| 7,606,311 B2 | 10/2009 | Hsu |
| 7,609,762 B2 | 10/2009 | Crinon |
| 7,616,692 B2 | 11/2009 | Holcomb |
| 7,620,106 B2 | 11/2009 | Holcomb |
| 7,623,574 B2 | 11/2009 | Holcomb |
| 7,630,438 B2 | 12/2009 | Mukerjee |
| 7,664,177 B2 | 2/2010 | Mukerjee |
| 7,680,185 B2 | 3/2010 | Mukerjee |
| 7,688,894 B2 | 3/2010 | Liang |
| 7,724,827 B2 | 5/2010 | Liang |
| 7,782,954 B2 | 8/2010 | Liang |
| 7,839,930 B2 | 11/2010 | Holcomb |
| 7,852,919 B2 | 12/2010 | Crinon |
| 7,852,936 B2 | 12/2010 | Mukerjee |
| 7,924,920 B2 | 4/2011 | Hsu |
| 7,924,921 B2 | 4/2011 | Crinon |
| 7,961,786 B2 | 6/2011 | Holcomb |
| 8,009,739 B2 | 8/2011 | Holcomb |
| 8,014,450 B2 | 9/2011 | Regunathan |
| 8,064,520 B2 | 11/2011 | Mukerjee |
| 8,085,844 B2 | 12/2011 | Holcomb |
| 8,213,779 B2 | 7/2012 | Crinon |
| 2005/0052294 A1 | 3/2005 | Liang |
| 2005/0053134 A1 | 3/2005 | Holcomb |
| 2005/0053137 A1 | 3/2005 | Holcomb |
| 2005/0053140 A1 | 3/2005 | Holcomb |
| 2005/0053141 A1 | 3/2005 | Holcomb |
| 2005/0053142 A1 | 3/2005 | Holcomb |
| 2005/0053143 A1 | 3/2005 | Holcomb |
| 2005/0053144 A1 | 3/2005 | Holcomb |
| 2005/0053145 A1 | 3/2005 | Hsu |
| 2005/0053146 A1 | 3/2005 | Mukerjee |
| 2005/0053147 A1 | 3/2005 | Mukerjee |
| 2005/0053148 A1 | 3/2005 | Mukerjee |
| 2005/0053149 A1 | 3/2005 | Mukerjee |
| 2005/0053150 A1 | 3/2005 | Hsu |
| 2005/0053155 A1 | 3/2005 | Holcomb |
| 2005/0053158 A1 | 3/2005 | Regunathan |
| 2005/0053288 A1 | 3/2005 | Srinivasan |
| 2005/0053292 A1 | 3/2005 | Mukerjee |
| 2005/0053293 A1 | 3/2005 | Lin |
| 2005/0053295 A1 | 3/2005 | Holcomb |
| 2005/0053296 A1 | 3/2005 | Srinivasan |
| 2005/0053297 A1 | 3/2005 | Mukerjee |
| 2005/0053298 A1 | 3/2005 | Mukerjee |
| 2005/0053300 A1 | 3/2005 | Mukerjee |
| 2005/0058205 A1 | 3/2005 | Holcomb |
| 2005/0063471 A1 | 3/2005 | Regunathan |
| 2005/0068208 A1 | 3/2005 | Liang |
| 2005/0078754 A1 | 4/2005 | Liang |
| 2005/0084012 A1 | 4/2005 | Hsu |
| 2005/0099869 A1 | 5/2005 | Crinon |
| 2005/0100093 A1 | 5/2005 | Holcomb |
| 2005/0105883 A1 | 5/2005 | Holcomb |
| 2005/0111547 A1 | 5/2005 | Holcomb |
| 2005/0123274 A1 | 6/2005 | Crinon |
| 2005/0135783 A1 | 6/2005 | Crinon |
| 2005/0152448 A1 | 7/2005 | Crinon |
| 2007/0110153 A1 | 5/2007 | Cho |
| 2008/0310745 A1 | 12/2008 | Ye |
| 2009/0168890 A1 | 7/2009 | Holcomb |
| 2012/0123282 A1 | 5/2012 | Baker, Jr. |
| 2012/0128073 A1 | 5/2012 | Asaka |
| 2012/0294363 A1 | 11/2012 | Lee |
| 2012/0300848 A1 | 11/2012 | Kim |
| 2012/0328015 A1 | 12/2012 | Kim |
| 2013/0272377 A1* | 10/2013 | Karczewicz ............ H03M 7/30 375/240.02 |
| 2014/0072041 A1* | 3/2014 | Seregin ................ H04N 19/105 375/240.13 |

FOREIGN PATENT DOCUMENTS

| | | |
|---|---|---|
| KR | 10-2011-0069740 | 6/2011 |
| WO | 2011/068330 | 6/2011 |
| WO | 2011/074919 | 6/2011 |

* cited by examiner

CU: 
8x8

PU: 
8x8    8x4    4x8    4x4

METHOD FOR DECODING IMAGE AND APPARATUS USING SAME

CROSS REFERENCE TO RELATED APPLICATIONS

This application is a continuation of U.S. application Ser. No. 15/707,794 filed on Sep. 18, 2017, now allowed, which is a continuation of U.S. application Ser. No. 15/464,611 filed on Mar. 21, 2017, now U.S. Pat. No. 9,769,487, which is a continuation of U.S. application Ser. No. 14/359,634 filed May 21, 2014, now U.S. Pat. No. 9,621,909, which is a U.S. National Phase application of International Application PCT/KR2013/005858, filed on Jul. 2, 2013, which claims the benefit of U.S. Provisional Application No. 61/666,936, filed on Jul. 2, 2012, and U.S. Provisional Application No. 61/666,938, filed on Jul. 2, 2012, the entire contents of the prior applications are hereby incorporated by reference.

TECHNICAL FIELD

The present invention relates to a method of coding image information and an apparatus using the same, and more particularly, to a method and an apparatus for binarizing image information.

BACKGROUND ART

Recently, demands for high-resolution and high-quality images have increased in various fields of applications. As images have higher resolution and higher quality, the amount of information on the images also increases.

With a growing amount of information, multi-functional devices and networks with various environments are introduced. Accordingly, the same content may be utilized with different levels of quality.

Specifically, as terminals are able to support diverse qualities of videos and various network environments are established, a video with general quality is enabled in one environment while a higher-quality video may be available in another environment.

For example, a user may enjoy video content purchased through a portable terminal on a large-screen display with higher resolution at home.

In recent years, as high definition (HD) broadcast services are available, a large number of users is getting used to high-resolution and high-quality videos and service providers and service users also pay attention to ultrahigh-definition (UHD) services having a resolution four times higher than HDTV.

Thus, there is a need to provide scalability to video quality, for example, the image quality, resolution, size and frame rate of a video, based on high-efficiency encoding and decoding methods on a high-capacity video so as to offer varied qualities of video services in different environments for users' demands.

DISCLOSURE

Technical Problem

An aspect of the present invention is to provide a method of binarizing an inter prediction direction of a prediction unit having a specific size and an apparatus using the same.

Another aspect of the present invention is to provide a method of binarizing an inter prediction direction of a prediction unit employing unidirectional inter prediction and an apparatus using the same.

Still another aspect of the present invention is to provide a method of binarizing an inter-prediction direction in a differential manner based on a number of inter prediction directions and an apparatus using the same.

Technical Solution

An embodiment of the present invention provides a method of coding video information, the method including binarizing index values of forward prediction, backward prediction and bidirectional prediction to different manner based on whether bidirectional prediction is applied to a current block in inter prediction, and entropy-coding the binarized codewords, wherein whether bidirectional prediction is applied to the current block in inter prediction is determined based on a size of the current block.

When a coding unit including the current block has an 8×8 size and a partition mode of the current block is not a 2N×2N, bidirectional prediction may not be applied to the current block.

When the current block has a sum of width and length of 12, bidirectional prediction may not be applied to the current block.

The current block may be a prediction block.

When bidirectional prediction is applied to the current block in inter prediction, index values of forward prediction and backward prediction may be allocated 2-bit codewords and an index value of bidirectional prediction may be allocated a 1-bit codeword.

When bidirectional prediction is not applied to the current block in inter prediction, index values of forward prediction and backward prediction may be allocated 1-bit codewords.

Another embodiment of the present invention provides an apparatus for coding video information, the apparatus including an entropy encoding module to binarize index values of forward prediction, backward prediction and bidirectional prediction to different manner based on whether bidirectional prediction is applied to a current block in inter prediction and to entropy-code the binarized codewords, wherein whether bidirectional prediction is applied to the current block in inter prediction is determined based on a size of the current block.

Advantageous Effects

An embodiment of the present invention provides a method of binarizing an inter prediction direction of a prediction unit having a specific size and an apparatus using the same.

Another embodiment of the present invention provides a method of binarizing an inter prediction direction of a prediction unit employing unidirectional inter prediction and an apparatus using the same.

Still another embodiment of the present invention provides a method of binarizing an inter-prediction direction in a differential manner based on a number of inter prediction directions and an apparatus using the same.

Yet another embodiment of the present invention reduces coded information to improve compression rate of video information.

MODE FOR INVENTION

Figure 1:
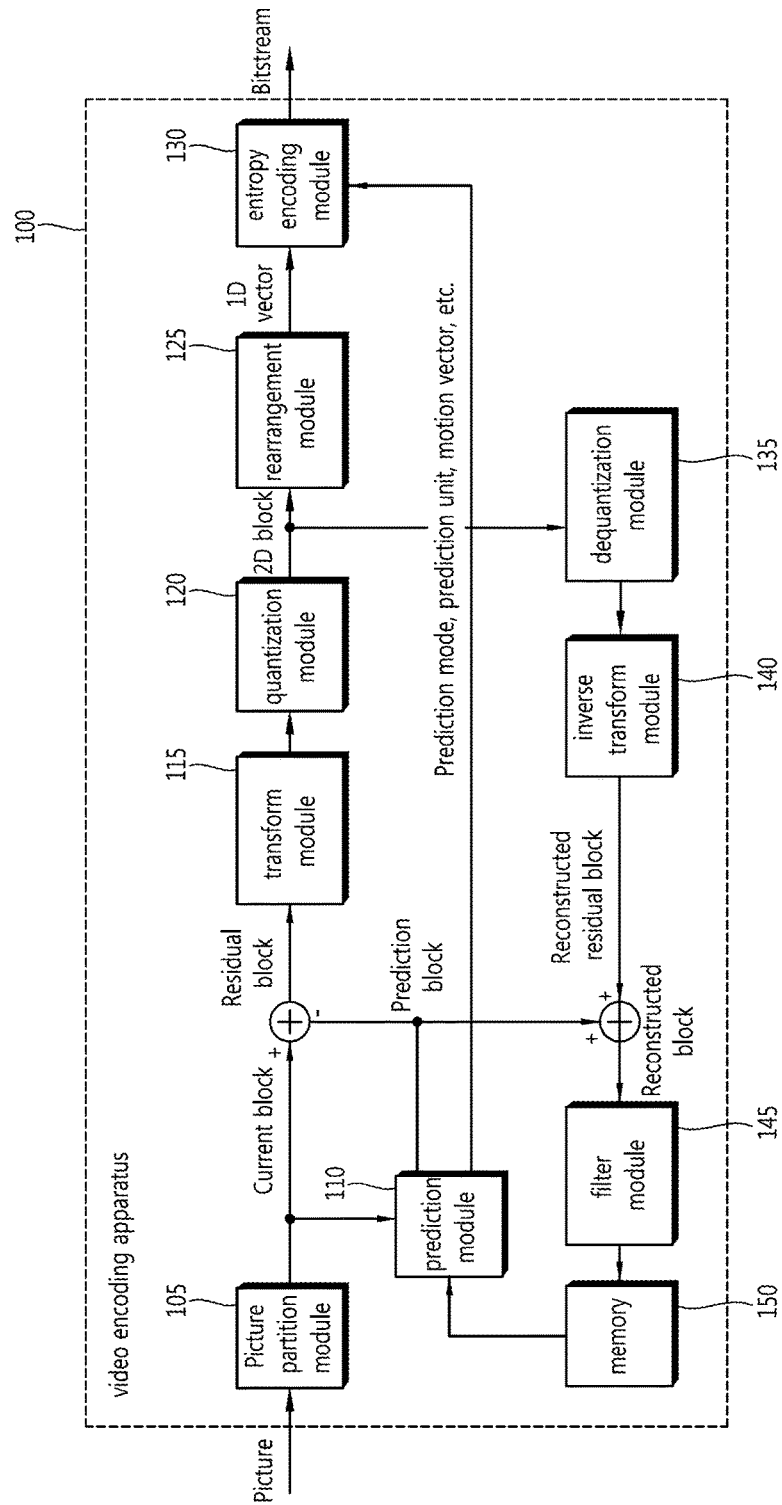
FIG. 1 is a block diagram schematically illustrating a video encoding apparatus according to an exemplary embodiment of the present invention.

The present invention may be changed and modified variously and be illustrated with reference to different exemplary embodiments, some of which will be described in detail and shown in the drawings. However, these embodiments are not intended for limiting the invention. The terminology used herein is for the purpose of describing particular embodiments only and is not intended to be limiting the technical idea of the invention. As used herein, the singular forms "a," "an" and "the" are intended to include the plural forms as well, unless the context clearly indicates otherwise. It will be further understood that the terms "include" and/or "have," when used in this specification, specify the presence of stated features, integers, steps, operations, elements, components, and/or combinations thereof, but do not preclude the presence or addition of one or more other features, integers, steps, operations, elements, components, and/or combinations thereof.

Although elements illustrated in the drawings are independently shown for convenience of description of different distinctive functions in a video encoding apparatus/decoding apparatus, such a configuration does not indicate that each element is constructed by a separate hardware constituent or software constituent. That is, at least two elements may be combined into a single element, or a single element may be divided into a plurality of elements to perform functions. It is to be noted that embodiments in which some elements are integrated into one combined element and/or an element is divided into multiple separate elements are included in the scope of the present invention without departing from the essence of the present invention.

Hereinafter, exemplary embodiments of the invention will be described in detail with reference to the accompanying drawings. Like reference numerals in the drawings refer to like elements throughout, and redundant descriptions of like elements will be omitted herein.

FIG. 1 is a block diagram schematically illustrating a video encoding apparatus according to an exemplary embodiment of the present invention. A video encoding/decoding method or apparatus may be realized by extension of a general video encoding/decoding method or apparatus that does not provide scalability, and a scalable video encoding apparatus may be based on the video encoding apparatus FIG. 1.

Referring to FIG. 1, the video encoding apparatus 100 includes a picture partition module 105, a prediction module 110, a transform module 115, a quantization module 120, a rearrangement module 125, an entropy encoding module 130, a dequantization module 135, an inverse transform module 140, a filter module 145 and a memory 150.

The picture partition module 105 may divide an input picture into at least one block as a processing unit. Here, the block as the processing unit may be a prediction unit (PU), a transform unit (TU) or a coding unit (CU).

Processing unit blocks divided by the picture partition module 105 may have a quadtree structure.

The prediction module 110 may include an inter prediction module to perform inter prediction and an intra prediction module to perform intra prediction, which will be described. The prediction module 110 generates a prediction block by performing prediction on the processing unit of the picture from the partition module 105. The processing unit of the picture in the prediction module 110 may be a CU, a TU or a PU. Furthermore, the prediction module 110 may determine whether prediction performed on the processing unit is inter prediction or intra prediction, and may determine details (for example, a prediction mode) of each prediction method. Here, a processing unit on which prediction is performed may be different from a processing unit for which a prediction method and details on the prediction method are determined. For example, a prediction method and a prediction mode may be determined for each PU, while prediction may be performed for each TU.

In inter prediction, a prediction block may be generated by performing prediction based on information on at least one of previous and/or subsequent pictures of a current picture. In intra prediction, a prediction block may be generated by performing prediction based on information on a pixel within the current picture.

A skip mode, a merge mode and motion vector prediction (MVP) may be used as an inter prediction method. In inter prediction, a reference picture for a PU may be selected, and a reference block corresponding to the PU may be selected. The reference block may be selected as a unit of inter pixel. Subsequently, a prediction block that has a minimum residual signal with respect to the current PU and has a minimum-size motion vector is generated.

The prediction block may be generated as an integer sample unit or as a pixel unit smaller than an integer pixel, such as a ½ pixel unit and a ¼ pixel unit. Here, the motion vector may be represented in a unit smaller than an integer pixel.

Information including an index of the reference pixel selected in inter prediction, the motion vector (e.g., a motion vector predictor) and the residual signal, is entropy-encoded and transferred to a decoding apparatus. In the skip mode, since the prediction block may be a reconstructed block, the residual may not be generated, transformed, quantized and transferred.

In intra prediction, a prediction mode is determined by a PU, and prediction may be performed by a PU. Alternatively, a prediction mode may be determined by a PU, and intra prediction may be performed in a TU.

Intra prediction may include 33 directional prediction modes and two or more non-directional modes. The non-directional modes may include a DC prediction mode and a planar mode.

In intra prediction, the prediction block may be generated after applying a filter to a reference sample. Here, whether to apply the filter to the reference sample may be determined on an intra prediction mode and/or size of a current block.

A residual value (residual block or residual signal) between the generated prediction block and an original block is input to the transform module 115. Also, information on a prediction mode and a motion vector used for prediction are encoded along with the residual value by the entropy encoding module 130 and transferred to the decoding apparatus.

The transform module 115 transforms the residual block by a TU and generates a transform coefficient.

A transform block is a rectangular block of samples to which the same transformation is applied. The transform block may be a TU and have a quadtree structure.

The transform module 115 may perform transformation based on a prediction mode applied to the residual block and a size of the block.

For example, when intra prediction is applied to the residual block and the block has a 4×4 residual array, the transform module 115 may transform the residual block using discrete cosine transform (DCT). Otherwise, the transform module 115 may transform the residual block using discrete sine transform (DST).

The transform module 115 may generate a transform block of transform coefficients by transformation.

The quantization module 120 may quantize residual values transformed by the transform module 115, that is, the transform coefficients, to generate quantized transform coefficients. The coefficients generated by the quantization module 120 are provided to the dequantization module 135 and the rearrangement module 125.

The rearrangement module 125 rearranges the quantized transform coefficients provided by the quantization module 120. Rearranging the quantized transform coefficients may enhance encoding efficiency in the entropy encoding module 130.

The rearrangement module 125 may rearrange a two-dimensional (2D) block of the quantized transform coefficients into a one-dimensional (1D) vector using coefficient scanning.

The entropy encoding module 130 may perform entropy coding on symbols according to probability distribution based on the quantized transform coefficients rearranged by the rearrangement module 125 or encoding parameter values derived in coding, thereby outputting a bitstream. Entropy encoding is a method of receiving symbols having different values and representing the symbols as a decodable binary sequence or string while removing statistical redundancy.

Here, a symbol means a syntax element as an encoding/decoding target, a coding parameter, a value of a residual signal, or the like. A coding parameter, which is a parameter necessary for encoding and decoding, may include information encoded by the encoding apparatus and transferred to the decoding apparatus, such as a syntax element, and information derived during an encoding or decoding process. This is the coding parameter means information necessary for encoding and decoding a picture. The coding parameter may include, for example, values or statistics of an intra/inter prediction mode, a movement/motion vector, a reference picture index, an encoding block pattern, presence and absence of a residual signal, a transform coefficient, a quantized transform coefficien, a quantization parameter, a block size and block partitioning information. A residual signal may denote a difference between an original signal and a prediction signal, a signal obtained by transforming the difference between the original signal and the prediction signal, or a signal obtained by transforming and quantizing the difference between the original signal and the prediction signal. The residual signal may be referred to as a residual block in a block unit.

When entropy encoding is applied, symbols are represented by allocating a small number of bits to symbols having a high probability and allocating a large number of bits to symbols having a low probability, thereby reducing a size of bit strings for symbols to be encoded. Therefore, entropy encoding may enhance compression performance of video encoding.

Encoding methods, such as exponential Golomb, context-adaptive variable length coding (CAVLC) and context-adaptive binary arithmetic coding (CABAC), may be used for entropy encoding. For example, the entropy encoding module 130 may store a table used for performing entropy encoding, such as a variable length coding/code (VLC) table, and the entropy encoding module 130 may perform entropy encoding using the stored VLC table. In addition, the entropy encoding module 130 may derive a binarization method for a target symbol and a probability model for a target symbol/bin and perform entropy encoding using the derived binarization method or probability model.

Here, binarization means representing values of symbols as a bin sequence/string. A bin means each bin value (0 or 1) when a symbol is represented as a bin sequence/string through binarization.

A probability model means a predicted probability of a symbol/bin as an encoding/decoding target that may be derived through context information/context model. Context information/context model is information for determining a probability of a symbol/bin as an encoding/decoding target.

In more detail, CABAC as an entropy encoding method transforms a symbol that is not binarized into a bin by binarization, determines a context model using encoding information on a neighboring block and a encoding target block or information on a symbol/bin encoded in a previous stage, and predicts a probability of a bin according to the determined context model and performs arithmetic encoding of the bin, thereby generating a bitstream. Here, CABAC may determine the context model, and then update the context model using information on an encoded symbol/bin for a context model for a next symbol/bin.

Furthermore, the entropy coding module 130 may apply a change to a received parameter set or syntax as necessary.

The dequantization module 135 dequantizes the values quantized by the quantization module 120, that is, the quantized transform coefficients, and the inverse transform module 140 inverse-transforms the values dequantized by the dequantization module 135.

The residual values generated through the dequantization module 135 and the inverse transform module 140 are merged with the prediction block predicted by the prediction module 110, thereby generating a reconstructed block.

FIG. 1 illustrates that a reconstructed block is generated by merging a residual block with a prediction block through an adder. Here, the adder may be regarded as a separate module for generating a reconstructed block (reconstructed block generation module).

The filter module 145 may apply a deblocking filter, an adaptive loop filter (ALF), and a sample adaptive offset (SAO) to a reconstructed picture.

The deblocking filter may remove block distortion generated on boundaries between blocks in the reconstructed picture. The ALF may perform filtering based on a value obtained by comparing the reconstructed picture obtained by filtering blocks using the deblocking filter with the original picture. The ALF may be employed only for high efficiency. The SAO compensates an offset difference between the residual block to which the deblocking filter has been applied and the original picture by a pixel unit, in which a band offset or an edge offset is used.

Meanwhile, the filter module 145 may not apply filtering to a reconstructed block used in inter prediction.

The memory 150 may store the reconstructed block or picture obtained via the filter module 145. The reconstructed block or picture stored in the memory 150 may be provided to the prediction module 110 performing inter prediction.

Figure 2:
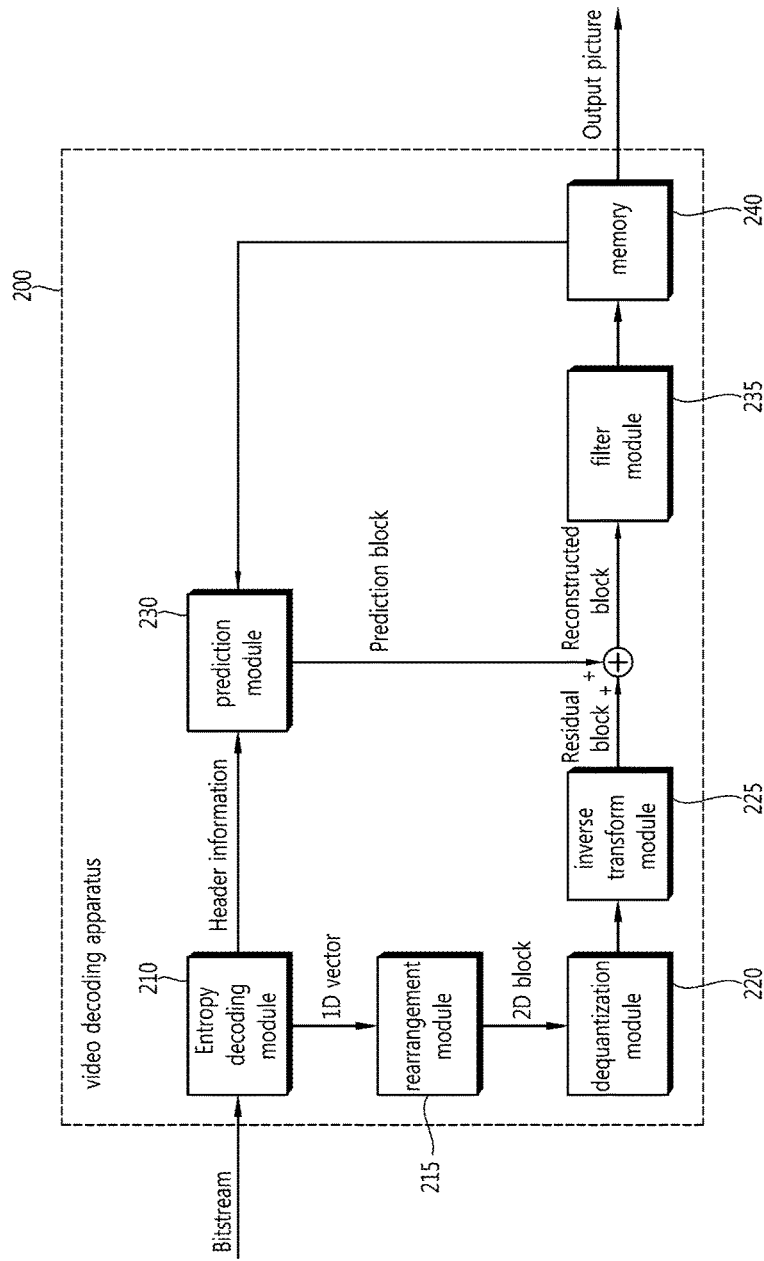
FIG. 2 is a block diagram schematically illustrating a video decoding apparatus according to an exemplary embodiment of the present invention.

FIG. 2 is a block diagram schematically illustrating a video decoding apparatus according to an exemplary embodiment of the present invention. As described above in FIG. 1, a scalable video encoding/decoding method or apparatus may be realized by extension of a general video encoding/decoding method or apparatus that does not provide scalability, and a scalable video decoding apparatus may be based on the video decoding apparatus FIG. 2.

Referring to FIG. 2, the video decoding apparatus 200 may include an entropy decoding module 210, a rearrangement module 215, an dequantization module 220, an inverse transform module 225, a prediction module 230, a filter module 235, and a memory 240.

When a video bitstream is input from the video encoding apparatus, the input bitstream may be decoded according to an inverse procedure by which the video encoding apparatus processes video information.

The entropy decoding module 210 performs entropy decoding on an input bitstream according to probability distribution to generate symbols including quantized coefficient type of symbols. Entropy decoding is a method of receiving a binary sequence or string and generating each symbol. Entropy decoding is similar to entropy encoding described above.

For example, if the video encoding apparatus uses variable length coding (VLC), such as CAVLC, to perform entropy encoding, the entropy decoding module 210 may perform entropy decoding by implementing the same VLC table as used in the encoding apparatus. Furthermore, if the video encoding apparatus uses CABAC to perform entropy ending, the entropy decoding module 210 may also perform entropy decoding using CABAC.

In more detail, CABAC as an entropy decoding method may receive a bin corresponding to each syntax element in the bitstream, determines a context model using information on a syntax element to be decoded and decoding information on a neighboring block and a block to be decoded or information on a symbol/bin decoded in a previous stage, and predict a probability of a bin according to the determined context model to perform arithmetic decoding of the bin, thereby generating a symbol corresponding to a value of each syntax element. Here, CABAC may determine the context model, and then update the context model using information on a decoded symbol/bin for a context model for a next symbol/bin.

When entropy decoding is applied, symbols are represented by allocating a small number of bits to symbols having a high probability and allocating a large number of bits to symbols having a low probability, thereby reducing a size of bit strings for each symbol. Therefore, entropy decoding may enhance compression performance of video decoding.

Information for generating a prediction block, among pieces of information decoded by the entropy decoding module 210, may be provided to the prediction module 230. Residual values entropy-decoded by the entropy decoding module 210, that is, quantized transform coefficients, may be input to the rearrangement module 215.

The rearrangement module 215 may rearrange information on the bitstream entropy-decoded by the entropy decoding module 210, that is, the quantized transform coefficients, based on a rearrangement method used in the encoding apparatus.

The rearrangement module 215 may reconstruct and rearrange a 1D vector of coefficients into a 2D block of coefficients. The rearrangement module 215 may scan coefficients based on a prediction mode of a current block (transform block) and a size of the transform block to generate a 2D block of coefficients (quantized transform coefficients).

The dequantization module 220 may perform dequantization based on a quantization parameter provided from the encoding apparatus and the rearranged coefficients of the block.

The inverse transform module 225 may perform inverse DCT and/or inverse DST on a result of quantization performed by the video encoding apparatus in response to DCT and DST performed by the transform module of the encoding apparatus.

Inverse transformation may be performed on the basis of a transfer unit or a partition unit of a picture determined by the video encoding apparatus. The transform module of the video encoding apparatus may selectively perform DCT and/or DST depending on a plurality of information elements, such as a prediction method, a size of the current block and a prediction direction, and the inverse transform module 225 of the video decoding apparatus may perform inverse transformation on the basis of information on the transformation performed by the transform module of the video encoding apparatus.

The prediction module 230 may generate a prediction block based on information on generation of the prediction block provided from the entropy decoding module 210 and information on a previously decoded block and/or picture provided by the memory 240.

When a prediction mode for a current PU is an intra prediction mode, intra prediction may be performed based on information on a pixel in a current picture to generate the prediction block.

When a prediction mode for the current PU is an inter prediction mode, inter prediction for the current PU may be performed based on information on at least one of previous and subsequent pictures of the current picture. Here, motion information necessary for the inter prediction for the current PU provided by the video encoding apparatus, for example, information on a motion vector and a reference picture index, may be derived by checking a skip flag and a merge flag received from the encoding apparatus.

A reconstructed block may be generated using the prediction block generated by the prediction module 230 and the residual block provided by the inverse transform module 225. FIG. 2 illustrates that the reconstructed block is generated by the adder merging the prediction block with the residual block. Here, the adder may be regarded as a separate module for generating the reconstructed block (reconstructed block generation module).

When the skip mode is used, the prediction block may be the reconstructed block without transmitting the residual block.

The reconstructed block and/or picture may be provided to the filter module 235. The filter module 235 may apply deblocking filtering, SAO and/or AFL to the reconstructed block and/or picture.

The memory 240 may store the reconstructed picture or block to be used as a reference picture or a reference block and supply the reconstructed picture to an output unit.

Components directly related to video decoding among the entropy decoding module 210, the rearrangement module 215, the dequantization module 220, the inverse transform module 225, the prediction module 230, the filter 235 and the memory 240 of the decoding apparatus 200, for example, the entropy decoding module 210, the rearrangement module 215, the dequantization module 220, the inverse transform module 225, the prediction module 230 and the filter 235 may be defined as a decoder or a decoding unit, separately from the other components.

Further, the decoding apparatus 200 may further include a parsing module (not shown) to parse information about an encoded video included in the bitstream. The parsing module may include the entropy decoding module 210 or be included in the entropy decoding module 210. The parsing module may be provided as one component of the decoding unit.

Figure 3:
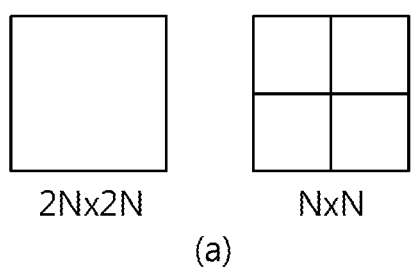
FIG. 3 illustrates a form of a prediction unit (PU) included in a coding unit (CU) according to the present invention.
Figure 3:
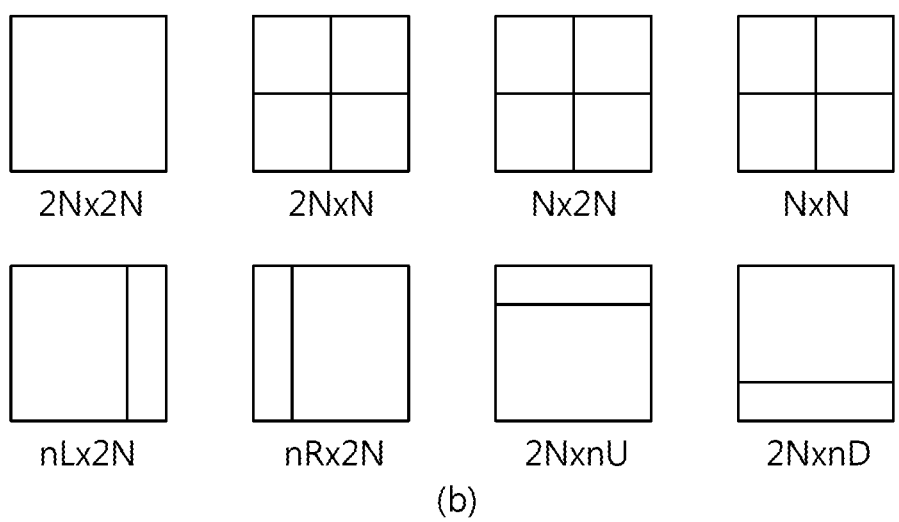

FIG. 3 illustrates a form of a PU included in a CU according to the present invention.

Video prediction for coding may be performed for a CU which is not further partitioned, that is, a leaf node of a CU tree. A current CU is divided into one or more PUs, prediction blocks or partitions, and this process is also referred to as partition. A PU is a basic unit for prediction, and different forms of PUs may be used for an intra CU and an inter CU.

(a) shows PUs for a CU for intra prediction. A 2N×2N CU for intra prediction may include a 2N×2N PU having the same size as the CU or be partitioned into N×N PUs, wherein N is an integer.

(b) shows PUs for a CU for inter prediction. A 2N×2N CU for inter prediction may include a 2N×2N PU having the same size as the CU or be partitioned into 2N×N PUs, N×2N PUs, N×N PUs, an nL×2N PU, an nR×2N PU, a 2N×nU PU and a 2N×nD PU.

Among the PUs for inter prediction, the nL×2N PU, nR×2N PU, 2N×nU PU and 2N×nD PU are obtained by asymmetrically partitioning the CU, and such partitioning may restrict prediction directions in inter prediction depending specific restrains.

A picture to be applied to inter prediction may include a P-picture and a B-picture. A P-picture may be a picture to be applied to unidirectional prediction using a single reference picture, and a B-picture may be a picture to be applied to forward, backward or bidirectional prediction using more than one reference pictures, for example, two reference pictures. For instance, a B-picture may be applied to inter prediction using one forward reference picture (previous picture) and one backward reference picture (subsequent picture). Also, two forward reference pictures or two backward reference pictures may be used to predict a B-picture.

Here, reference pictures may be managed on a reference picture list. A P-picture may use a single reference picture, which may be allocated to a reference picture list 0 (L0 or List0). A B-picture may use two reference pictures, which may be allocated to a reference picture list 0 and a reference picture list 1 (L1 or List1), respectively. Hereinafter, an L0 reference picture list may refer to a reference picture list 0, and an L1 reference picture list may refer to a reference picture list 1.

Generally, a forward reference picture may be allocated to a reference picture list 0, and a backward reference picture may be allocated to a reference picture list 1. Alternatively, without being limited to the foregoing example, a forward reference picture may be allocated to a reference picture list 1 and a backward reference picture may be allocated to a reference picture list 0. Hereinafter, a reference picture allocated to a reference picture list 0 is defined as an L0 reference picture, and a reference picture allocated to a reference picture list 1 as an L1 reference picture.

Reference pictures may be generally allocated to reference picture lists in descending order according to reference picture numbers. Here, the reference picture numbers may refer to numbers allocated to the reference pictures in picture order count (POC) order, and the POC order may be display order and/or chronological order of the pictures. For example, two reference pictures having the same reference picture number may be the same. The reference pictures allocated to the reference picture lists may be reordered by a reference picture list reordering (RPLR) or memory management control operation (MMCO) command.

As described above, a P-picture may be subjected to unidirectional prediction using a single L0 reference picture, and a B-picture may be subjected to forward, backward or bidirectional prediction using one L0 reference picture and one L1 reference picture, that is, two reference pictures. Prediction using a single reference picture may be referred to as uni-prediction, and prediction using two reference pictures including an L0 reference picture and an L1 reference picture may be referred to as bi-prediction.

While bi-prediction may be used to collectively refer to forward prediction, backward prediction and bidirectional prediction, in the following embodiments, prediction using two reference pictures, L0 and L1 reference pictures, is defined as bidirectional prediction for convenience. That is, it should be noted that bidirectional prediction may refer to bi-prediction and be construed as including forward prediction, backward prediction and bidirectional perdition using two reference pictures including L0 and L1 reference pictures. Further, while forward prediction or backward prediction may be also performed when bi-prediction is performed, in the following embodiment, prediction using only one reference picture is defined as unidirectional prediction for convenience. That is, it may be noted that unidirectional prediction may denote uni-prediction and include prediction using a single reference picture only. Information indicating which of unidirectional prediction (uni-prediction) or bidirectional prediction (bi-prediction) is applied to a block to be predicted is referred to as prediction direction information.

The prediction direction information is encoded by the entropy encoding module 130 of the encoding apparatus and decoded by the entropy decoding module 210 of the decoding apparatus, thereby being used for inter prediction.

Meanwhile, as described in FIG. 1, video information including the prediction direction information may be entropy-encoded and transmitted in a bitstream to the decoding apparatus. The decoding apparatus entropy-decodes the received bitstream to obtain the video information including predicted information, as described in FIG. 2.

Figure 4:
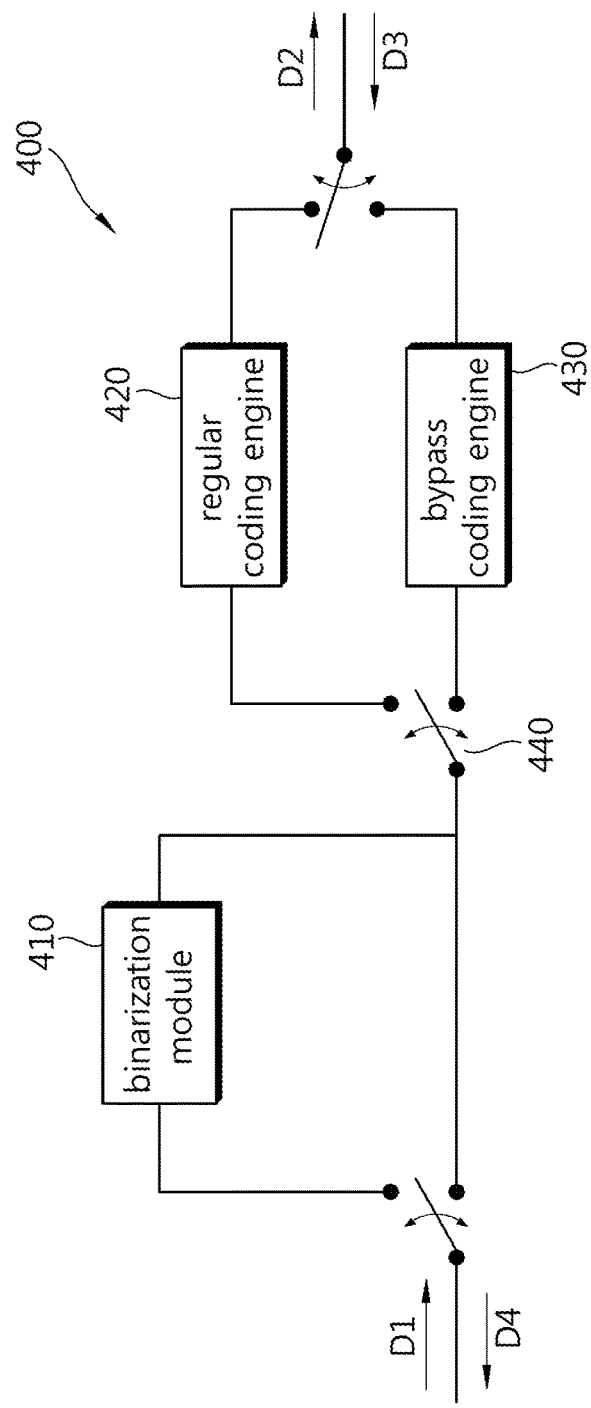
FIG. 4 schematically illustrates an entropy coding module according to the present invention.

FIG. 4 schematically illustrates an entropy coding module according to the present invention. A configuration of the entropy coding module illustrated in FIG. 4 may be applied to both entropy encoding and entropy decoding.

Considering FIG. 4 as an entropy encoding module, the entropy encoding module 400 may include a binarization module 410, a regular coding engine 420 and a bypass coding engine 430.

Here, entropy encoding processes a signal input in a D1 direction and outputs the processed signal in a D2 direction.

When the input signal is a syntax element, not a binary value, the binarization module 410 transforms the input signal into a binary number. When the input signal is a binary value, the input signal may bypass the binarization module 410.

Each digit of an input binary value is referred to as a bin. For example, when an input binary value is 110, each of 1, 1 and 0 is a bin. A binary sequence of bins is referred to as a bin string.

The binarization module 410 may binarize the prediction direction information as illustrated in Table 1.

TABLE 1

|    | P-slice | B-slice |
|----|---------|---------|
| L0 | 0       | 00      |
| L1 | 1       | 01      |
| BI | x       | 1       |

Referring to Table 1, for a P-slice to be applied to unidirectional prediction, the binarization module 410 may binarize the prediction direction information to "0" when forward prediction is performed, and to "1" when backward prediction is performed.

For a B-slice to be applied to bidirectional prediction, the binarization module 410 may binarize the prediction direction information to "00" when forward prediction is performed, to "01" when backward prediction is performed, and to "1" when bidirectional prediction is performed.

Alternatively, the binarization module 410 may binarize the prediction direction information as illustrated in Table 2.

TABLE 2

|    | P-slice | B-slice |
|----|---------|---------|
| L0 | 0       | 00      |
| L1 | 1       | 01      |
| BI | x       | 10      |

Referring to Table 2, for a P-slice to be subjected to unidirectional prediction, the binarization module 410 may binarize the prediction direction information to "0" when forward prediction is performed, and to "1" when backward prediction is performed.

For a B-slice to be subjected to bidirectional prediction, the binarization module 410 may binarize the prediction direction information to "00" when forward prediction is performed, to "01" when backward prediction is performed, and to a 2-bit "10" when bidirectional prediction is performed, similarly to another case of the B-slice.

Binarization in Table 2, simplified as compared with binary values of Table 1, may facilitate realization of hardware functioning to encode and decode video information.

In Tables 1 and 2, when a prediction direction of a PU to be applied to inter prediction is not restricted, the binarization module 410 allocates the binary values according to the prediction direction information.

Meanwhile, a prediction direction may be limited depending on a CU size or PU size. For instance, a PU with a particular size may have restriction in applying bidirectional prediction in order to reduce complexity or enhance coding efficiency. In this case, using the same binary values as listed in Tables 1 and 2 for bidirectional prediction may cause redundancy of bins and waste of transmitted information.

Thus, in the exemplary embodiment, the binarization module 410 may binarize index values of forward prediction, backward prediction and bidirectional prediction in different manners based on whether bidirectional prediction is applied to the current block in inter prediction. Here, the current block may be a CU or PU.

For instance, when bidirectional prediction is applied to the current block in inter prediction, the binarization module 410 may allocate 2-bit codewords to index values of forward prediction and backward prediction and allocate a 1-bit codeword to an index value of bidirectional prediction.

However, when bidirectional prediction is not applied to the current block in inter prediction, the binarization module 410 may allocate 1-bit codewords to the index values of forward prediction and backward prediction.

Here, whether bidirectional prediction is applied may be determined based on a size of the current block.

Table 3 illustrates codewords the binarization module 410 allocates to prediction direction indexes.

TABLE 3

|    |         | B slice |           |
|    | P slice | 8 × 8 CU && !SIZE_2N × 2N | Otherwise |
|----|---------|---------|-----------|
| L0 | 0       | 0       | 00        |
| L1 | 1       | 1       | 01        |
| BI | x       | x       | 1         |

Referring to Table 3, for a P-slice, the same 1-bit codewords as in Tables 1 and 2 are allocated to the prediction direction indexes.

However, for a B-slice, different binary values are allocated to the prediction direction indexes depending on whether bidirectional prediction is applied. When the current block has a particular size (8×8CU && !SIZE 2N×2N), that is, bidirectional prediction is not applied, the binarization module 410 allocates a codeword "0" to a forward prediction index and a codeword "1" to a backward prediction index, the same as for the P-slice.

However, when bidirectional prediction is applied to the current block, the binarization module 410 allocates a 2-bit codeword "00" to the forward prediction index and a 2-bit codeword "01" to the backward prediction index. The binarization module 410 allocates a 1-bit codeword "1" to a bidirectional prediction index.

In the present embodiment, when a CU including the current block has a 8×8 size and the current block has a 2N×2N partition mode, bidirectional prediction is not used in inter prediction.

Figure 5:
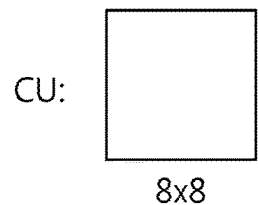
FIG. 5 illustrates partitioning an 8×8 CU according to the present invention.
Figure 5:
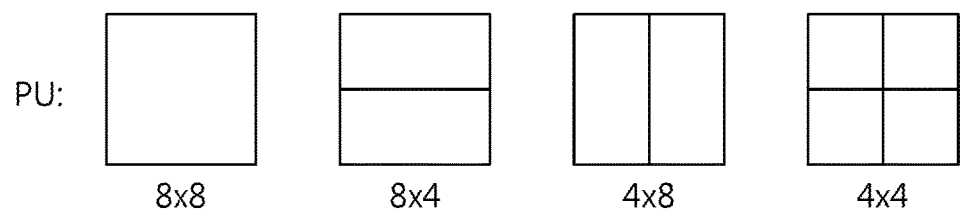

FIG. 5 illustrates partitioning an 8×8 CU. As shown in FIG. 5, the 8×8 CU may have four partitioning styles and accordingly be partitioned in a 8×8 PU, 8×4 PUs, 4×8 PUs, and 4×4 PUs.

Referring to Table 3, when the CU including a current block is 8×8 and a partition mode is not 8×8, that is, a PU has a smaller size, such as 8×4, 4×8 or 4×4, bidirectional prediction is not applied. Thus, the binarization module 410 allocates the same 1-bit codewords as for the P-slice to the forward prediction index and the backward prediction index for 8×4, 4×8 and 4×4 PUs.

Bidirectional prediction is applied to the 8×8 PU as for a general B-slice, and the binarization module 410 binarizes prediction direction information on the current block in the same manner as for the B-slice in Table 1. Here, the binarization module 410 may also allocate a codeword to the prediction direction information in the same binarization as in Table 2.

Alternatively, the binarization module 140 may apply the same binarization as in Table 3 to a PU of which a sum of width and length is 12. That is, when the current block has a 8×4 or 8×4 size among the PUs of FIG. 4, bidirectional prediction may not be applied, and accordingly the binarization module 410 may binarize prediction direction information on the PU with a 8×4 or 8×4 size in a different manner from for a PU with a different size.

Alternatively, when a partition mode of the current block is nL×2N, nR×2N, 2N×nU and 2N×nD as shown in FIG. 3(b), bidirectional prediction may not be applied.

For example, when a CU including a current slice has a 16×16 size and is partitioned into a nL×2N, nR×2N, 2N×nU or 2N×nD PU, the binarization module 410 may allocate codewords to prediction direction indexes as in Table 4.

TABLE 4

|  | P slice | B slice | |
| --- | --- | --- | --- |
|  |  | 16 × 16 CU && ASMP | Otherwise |
| L0 | 0 | 0 | 00 |
| L1 | 1 | 1 | 01 |
| BI | x | x | 1 |

In Table 4, an asymmetry motion partition (ASMP) refers to a PU partitioned asymmetrically.

Alternatively, bidirectional prediction may not be applied to only either of asymmetrically partitioned PUs. For example, bidirectional prediction may not be applied to only a smaller PU of the asymmetrically partitioned PUs.

Figure 6:
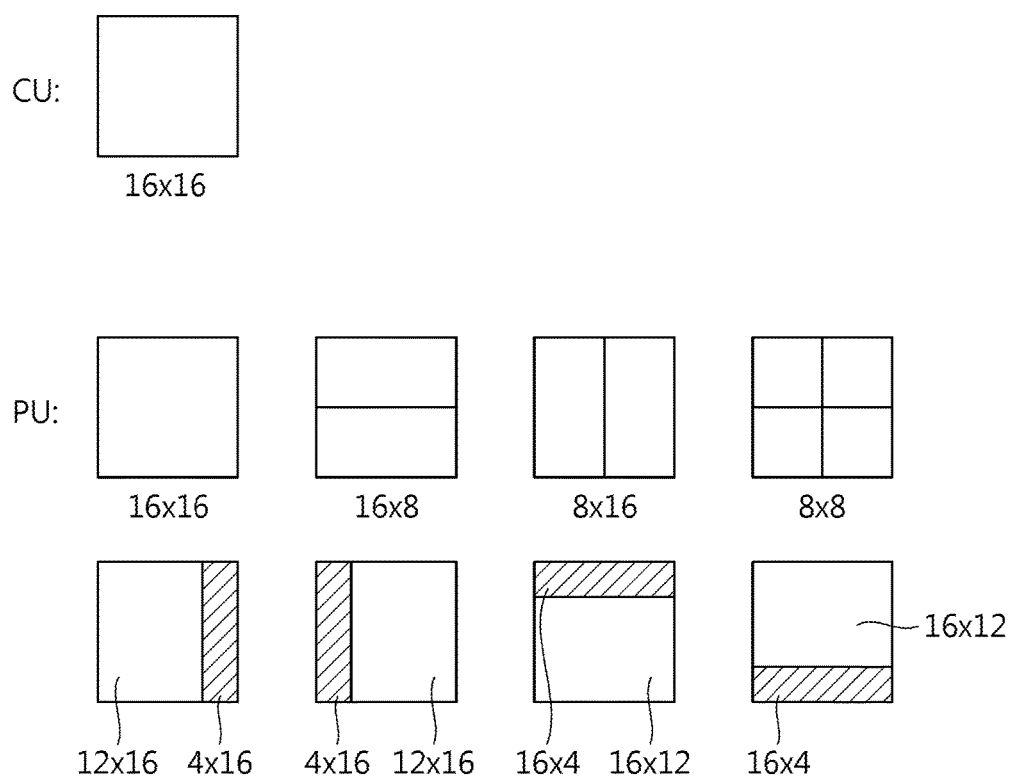
FIG. 6 illustrates partitioning a 16×16 CU according to the present invention.

FIG. 6 illustrates partitioning a 16×16 CU. As shown in FIG. 6, the 16×16 CU may have eight partitioning, that is, be partitioned into 16×16 PU, 16×8 PU, 8×16 PU, 8×8 PU, 12×16 PU, 4×16 PU, 16×4 PU and 16×12 PU.

Among asymmetrically partitioned PUs shown at the bottom of FIG. 6, bidirectional prediction may not be applied to smaller PUs, that is, 4×16 PU and 16×4 PU, in which case the binarization module 410 may binarize prediction direction information on the 4×16 PU and 16×4 PU in a different manner from for a PU with a different size. Table 5 illustrates a codeword allocated to prediction direction information.

TABLE 5

|  | P slice | B slice | |
| --- | --- | --- | --- |
|  |  | 16 × 16 CU && (((PU = 2N × nU\|nL × 2N) && PU id = 0) \|\| ((PU = 2N × rD\|nR × 2N) && PU id = 1)) | Otherwise |
| L0 | 0 | 0 | 00 |
| L1 | 1 | 1 | 01 |
| BI | x | x | 1 |

In Table 5, a PU id refers to an index of two partitioned PUs, wherein an index of 0 indicates a smaller PU among 2N×nU and nL×2N PUs and an index of 1 indicates a smaller PU among 2N×nD and nR×2N PUs. That is, these indexes indicate the PUs marked with slashes in FIG. 6 and bidirectional prediction may not be applied to the smaller PUs.

The binarized signal (bin string) is input to the regular coding engine 420 and the bypass coding engine 430.

The regular coding engine 420 allocates a context reflecting a probability value to a bin and encodes the bin based on the allocated context. The regular coding engine 420 may encode each bin and then update a context about the bin.

The bypass coding engine 430 encodes only a bin input in bypass mode without allocating a context depending on an input bin to enhance an encoding speed. In the bypass mode, processes of estimating a probability for an input bin and updating a probability applied to a bin after encoding are defined as bypassing. In the bypass mode, for example, uniform probability distribution is applied to an encoding process.

The entropy encoding module 400 determines whether to use the regular coding engine 420 or to use the bypass coding engine 430 to conduct entropy encoding and may switch an encoding route through 1 switching module 440.

Bins in Tables 1 to 5 may be input to the regular coding engine 420 for context coding for coding efficiency or input to the bypass coding engine 430 for convenient realization of hardware.

Alternatively, a first bin indicating bidirectional prediction may be subjected to context coding, while bins indicating forward prediction and backward prediction may be subjected to bypass coding. In this case, possibilities of forward prediction and backward prediction are considered nearly similar.

When context coding is used, a context of each bin may be changed on a depth of a current CU or have a fixed value.

The entropy encoding module 400 may be the entropy encoding module 130 of FIG. 1.

Considering FIG. 4 as an entropy decoding module, the entropy decoding module 400 may include a binarization module 410, a regular coding engine 420 and a bypass coding engine 430.

The entropy decoding module 400 processes a signal input in a D3 direction and outputs the processed signal in a D4 direction.

The binarization module 410, the regular coding engine 420 and the bypass coding engine 430 perform the same processes as those in the entropy encoding module in inverse order.

For example, the entropy decoding module 400 determines whether to use the regular coding engine 420 or to use the bypass coding engine 430 in decoding a bin of an input syntax element.

When the regular coding engine 420 is selected, the regular coding engine 420 performs decoding using a context. When the bypass coding engine 430 is selected, the bypass coding engine 430 performs decoding using uniform probability distribution. Binary codes are output from decoding by the coding engines 420 and 430.

When decoding all bins of a particular syntax (syntax element) is finished in the coding engines, binary codes output with respect to all bins of the syntax are added and the added code is determined which syntax value is mapped onto. When the output final binary code is mapped onto a particular syntax, a value the binary code is determined to be a value of the mapped syntax.

Here, the binarization module 410 may perform inverse binarization as necessary.

The binarization module 410 may decode binary codes in different manners base on Tables 1 to 5 depending on whether bidirectional prediction is performed for a current block in inter prediction.

Meanwhile, the decoding apparatus entropy-decodes a bitstream received from the encoding apparatus. Hereinafter, or convenience of description, when the encoding apparatus entropy-encodes video information, for example, using CABAC, an entropy decoding method adopted by the decoding apparatus is described.

For instance, when parsing a syntax element coded by CABAC, the decoding apparatus, specifically the entropy decoding module, starts a CABAC parsing process upon request for a value of the syntax element.

In detail, when the value of the syntax element is requested, binarization of the value of the syntax element is induced. Binarization is performed according to a binarization type, for example, unary binarization, truncated unary binarization, Exp-Golomb binarization and fixed length binarization.

A decoding process is determined on binarization of a syntax element and a sequence of parsed bins. Each bin of binarized values with respect to syntax elements is indexed using a bin index binIdx and a context index ctxIdx is derived for each bin. An initial value of a context index by each syntax element may be set. In this case, a context index table including context index values set for syntax elements may be used, which may be specified by an indicator, for example, a context index table indicator ctxIdxTable.

Arithmetic decoding is started for each context index.

Figure 7:
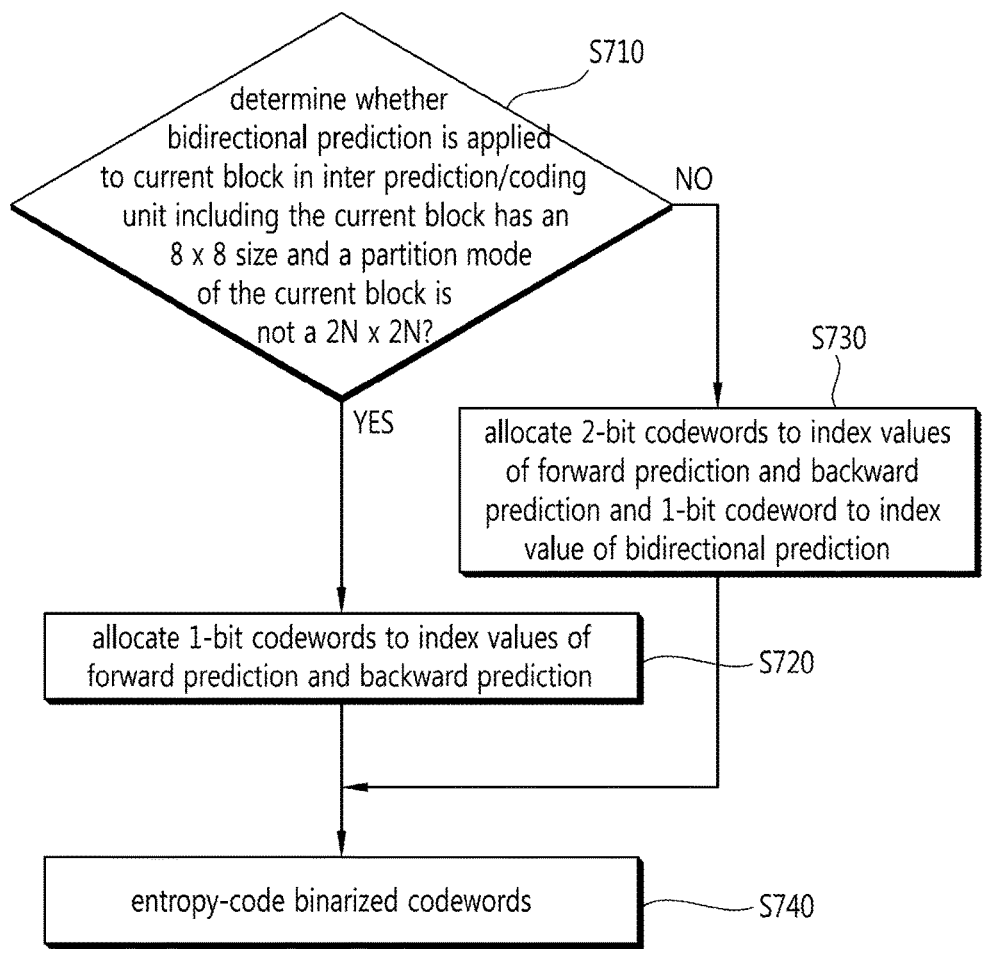
FIG. 7 is a flowchart illustrating a method of coding video information according to an exemplary embodiment of the present invention.

FIG. 7 is a flowchart illustrating a method of coding video information according to an exemplary embodiment of the present invention. For convenience of description, a method of coding prediction direction information in inter prediction as video information is illustrated, and the prediction direction information may be applied to a decoding process by performing the following process in inverse order. Entropy decoding and inverse binarization of the video information may be realized by various known methods.

Referring to FIG. 7, the entropy encoding module may binarize index values of forward prediction, backward prediction and bidirectional prediction in different manners depending on whether bidirectional prediction is applied to a current block in inter prediction (S710).

It may be determined based on a size of the current block whether bidirectional prediction is applied to the current block in inter prediction. For example, application of bidirectional prediction to the current block in inter prediction may be determined based on whether a CU including the current block has an 8×8 size and a partition mode of the current block is 2N×2N.

When the CU including the current block has an 8×8 size and the partition mode of the current block is not 2N×2N, the entropy encoding module determines that bidirectional prediction is not applied to the current block and allocates 1-bit codewords to index values of forward prediction and backward prediction (S720).

When the CU including the current block is not a block which has an 8×8 size and the partition mode of the current block is not 2N×2N, the entropy encoding modules determines that bidirectional prediction is applied to the current block in inter prediction, and allocates 2-bit codewords to the index values of forward prediction and backward prediction and 1-bit codewords to an index value of bidirectional prediction (S730).

The size of the current block which has a restriction that bidirectional prediction is not applied to the current block in inter prediction may be set variously. For example, when the current block has a sum of width and length of 12, bidirectional prediction may not be applied to the current block. When the current block has a 16×16 size and is PU asymmetrically partitioned or a smaller PU among the PU asymmetrically partitioned, bidirectional prediction may not be applied to the current block. Prediction direction information may be binarized based on Tables 3 to 5 depending on whether bidirectional prediction is applied.

A codeword of the binarized prediction direction information may be entropy-encoded by bypass coding or context coding (S740).

Although methods of illustrative systems have been described with a series of stages or blocks based on the flowcharts, the present invention is not limited to the foregoing sequence of the stages. Some stages may be carried out in different order from described above or at the same time. Further, it should be noted that as the aforementioned embodiments may include various aspects of examples, combinations of the embodiments may be also understood as exemplary embodiments of the present invention. Thus, it will be appreciated by those skilled in the art that changes, modifications and alternatives may be made in these exemplary embodiments without departing from the principles and spirit of be the invention, the scope of which is defined in the appended claims and their equivalents.

The invention claimed is:

1. A video decoding method, comprising:
receiving, by a decoding apparatus, a bitstream including information on an inter prediction type and information on a residual sample, wherein the information on the inter prediction type indicates whether list0 prediction, list1 prediction or bi-prediction is used as the inter prediction type for a current prediction unit;
deriving, by the decoding apparatus, a bin string of the information on the inter prediction type;
determining, by the decoding apparatus, the inter prediction type for the current prediction unit based on the bin string of the information on the inter prediction type;
deriving, by the decoding apparatus, a prediction sample of the current prediction unit based on the inter prediction type;
deriving, by the decoding apparatus, the residual sample based on the information on the residual sample; and
generating, by the decoding apparatus, a reconstructed sample based on the prediction sample and the residual sample,
wherein the current prediction unit is derived from a current coding unit based on a partition mode,
wherein when the current coding unit has an 8×8 size and the partition mode is 2N×N or N×2N, the bi-prediction is not available for the current prediction unit, and
wherein when the current coding unit has the 8×8 size and the partition mode is 2N×2N, the bi-prediction is available for the current prediction unit.

2. The method of claim 1, wherein when the current prediction unit has a sum of width and length of 12, the bi-prediction is not available for the current prediction unit.

3. The method of claim 1, wherein if the bi-prediction is available for the current prediction unit, the bin string for the list0 prediction or the list1 prediction consists of 2 bins, and
wherein if the bi-prediction is not available for the current prediction unit, the bin string for the list0 prediction or the list1 prediction consists of 1 bin.

4. The method of claim 3, wherein if the bi-prediction is available for the current prediction unit, the bin string for the bi-prediction consists of 1 bin.

5. The method of claim 1, wherein the list0 prediction is based on a reference picture list0, and the list1 prediction is based on a reference picture list1, and the bi-prediction is based on both the reference picture list0 and the reference picture list1.

6. A video encoding method, comprising:
determining, by an encoding apparatus, whether list0 prediction, list1 prediction or bi-prediction is used as an inter prediction type for a current prediction unit;
generating, by the encoding apparatus, information on the inter prediction type indicating whether the list0 prediction, the list1 prediction or the bi-prediction is used as the inter prediction type for the current prediction unit;

generating, by the encoding apparatus, information on a residual sample; and encoding, by the encoding apparatus, video information including the information on the inter prediction type and the information on the residual sample, wherein the current prediction unit is derived from a current coding unit based on a partition mode, wherein when the current coding unit has an 8×8 size and the partition mode is 2N×N or N×2N, the bi-prediction is not available for the current prediction unit, and wherein when the current coding unit has the 8×8 size and the partition mode is 2N×2N, the bi-prediction is available for the current prediction unit.

7. The method of claim 6, wherein when the current prediction unit has a sum of width and length of 12, the bi-prediction is not available for the current prediction unit.

8. The method of claim 6, wherein if the bi-prediction is available for the current prediction unit, a bin string for the list0 prediction or the list1 prediction consists of 2 bins, and wherein if the bi-prediction is not available for the current prediction unit, the bin string for the list0 prediction or the list1 prediction consists of 1 bin.

9. The method of claim 8, wherein if the bi-prediction is available for the current prediction unit, a bin string for the bi-prediction consists of 1 bin.

10. The method of claim 6, wherein the list0 prediction is based on a reference picture list0, and the list1 prediction is based on a reference picture list1, and the bi-prediction is based on both the reference picture list0 and the reference picture list1.

11. A non-transitory decoder-readable storage medium storing encoded video information generated by an encoding process comprising: determining, by an encoding apparatus, whether list0 prediction, list1 prediction or bi-prediction is used as an inter prediction type for a current prediction unit; generating, by the encoding apparatus, information on the inter prediction type indicating whether the list0 prediction, the list1 prediction or the bi-prediction is used as the inter prediction type for the current prediction unit; generating, by the encoding apparatus, information on a residual sample; and encoding, by the encoding apparatus, video information including the information on the inter prediction type and the information on the residual sample, wherein the current prediction unit is derived from a current coding unit based on a partition mode, wherein when the current coding unit has an 8×8 size and the partition mode is 2N×N or N×2N, the bi-prediction is not available for the current prediction unit, and wherein when the current coding unit has the 8×8 size and the partition mode is 2N×2N, the bi-prediction is available for the current prediction unit.

12. The non-transitory decoder-readable storage medium of claim 11, wherein when the current prediction unit has a sum of width and length of 12, the bi-prediction is not available for the current prediction unit.

13. The non-transitory decoder-readable storage medium of claim 11, wherein if the bi-prediction is available for the current prediction unit, a bin string for the list0 prediction or the list1 prediction consists of 2 bins, and wherein if the bi-prediction is not available for the current prediction unit, the bin string for the list0 prediction or the list1 prediction consists of 1 bin.

14. The non-transitory decoder-readable storage medium of claim 13, wherein if the bi-prediction is available for the current prediction unit, the bin string for the bi-prediction consists of 1 bin.

15. The non-transitory decoder-readable storage medium of claim 11, wherein the list0 prediction is based on a reference picture list0, and the list1 prediction is based on a reference picture list1, and the bi-prediction is based on both the reference picture list0 and the reference picture list1.

* * * * *